United States Patent [19]

Carter

[11] 4,226,164
[45] Oct. 7, 1980

[54] SPLIT THREADED COUPLING NUT

[76] Inventor: Alton L. Carter, 325 Claremore, Corpus Christi, Tex. 78412

[21] Appl. No.: 2,706

[22] Filed: Jan. 10, 1979

[51] Int. Cl.² ........................................... F16B 33/02
[52] U.S. Cl. ......................................... 85/33; 285/39; 285/373; 285/387; 285/DIG. 22; 285/354
[58] Field of Search .............. 285/387, 325, 373, 419, 285/DIG. 22, 39, 93, 38, 328, 354; 85/33, 51; 403/344

[56] References Cited

U.S. PATENT DOCUMENTS

| | | | |
|---|---|---|---|
| 436,357 | 9/1890 | King | 85/33 |
| 609,509 | 8/1898 | Jensen | 285/387 |
| 919,913 | 4/1909 | Miller | 285/384 |
| 1,082,993 | 12/1913 | Beattie | 85/32.1 |
| 1,405,342 | 1/1922 | Shoffer | 85/33 |
| 2,439,979 | 4/1948 | Krooss | 285/419 |
| 3,413,017 | 11/1968 | Hughey | 285/38 |
| 3,428,337 | 2/1969 | Read | 285/387 X |
| 3,498,642 | 3/1970 | Berger | 85/51 |
| 3,633,943 | 1/1972 | Rumm | 285/373 |
| 3,689,110 | 9/1972 | Ferguson | 285/387 X |

*Primary Examiner*—Dave W. Arola
*Attorney, Agent, or Firm*—Clarence A. O'Brien; Harvey B. Jacobson

[57] ABSTRACT

A pair of first and second coextensive generally semicylindrical nut halves are provided and include exterior surface portions engageable by hand or tools to facilitate turning of the halves, together, as a unitary nut. The nut halves include coextensively threaded inner surfaces and abuttingly and releasably interlocking structure on their adjacent arc ends whereby the nut halves are secured together as a unitary structure for utilization as a threaded coupling nut.

3 Claims, 4 Drawing Figures

SPLIT THREADED COUPLING NUT

BACKGROUND OF THE INVENTION

Various forms of plumbing joints utilize internally threaded slip nuts and it is not unusual for slip nuts to be broken or corroded to the extent that they must be replaced. Replacement of slip nuts, generally, requires the removal of adjacent pipe sections or fittings to enable a peripherally continuous replacement slip nut to be applied over an associated pipe section and such removal of a pipe section or fitting is time consuming and often results in unwanted "down time" of the related plumbing section. Accordingly, a need exists for structure enabling the ready replacement of broken or corroded slip nuts.

Examples of split-type threaded coupling or slip nuts similar to the subject of the instant invention are disclosed in U.S. Pat. Nos. 436,357, 609,509, 919,913, 1,082,993, 3,498,642 and 3,689,110.

However, these previously known forms of slip nuts and/or couplings, while being readily installable, are not constructed in a manner facilitating inexpensive production and yet providing a split threaded split nut operative in substantially the same manner as a conventional peripherally continuous slip nut.

BRIEF DESCRIPTION OF THE INVENTION

The split threaded coupling nut of the instant invention comprises a pair of nut halves which are coextensively internally threaded and include overlapped and releasably interlocked adjacent ends securing the nut halves together for use, substantially, in the manner of a peripherally continuous slip nut. The halves of the slip nut may be displaced axially relative to each other in order to detach the nut halves from each other, but the nut halves include snap fittingly engaged detent structure releasably preventing relative axial shifting for separation of the nut halves.

The main object of this invention is to provide a split threaded coupling nut constructed in a manner whereby it may be used in substantially the same manner as a peripherally continuous slip nut when the half sections thereof are releasably engaged with each other.

Another object of this invention is to provide a split threaded coupling nut constructed in a manner whereby it may be readily mass produced at a low cost.

Another important object of this invention is to provide a split threaded coupling nut which may be constructed of various materials such as metal or plastic.

A further important object of this invention is to provide a split threaded coupling nut including half sections thereof which may be readily releaseably interlockingly engaged with each other for use as a unitary threaded slip nut.

A final object of this invention to be specifically enumerated herein is to provide a split threaded coupling nut in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
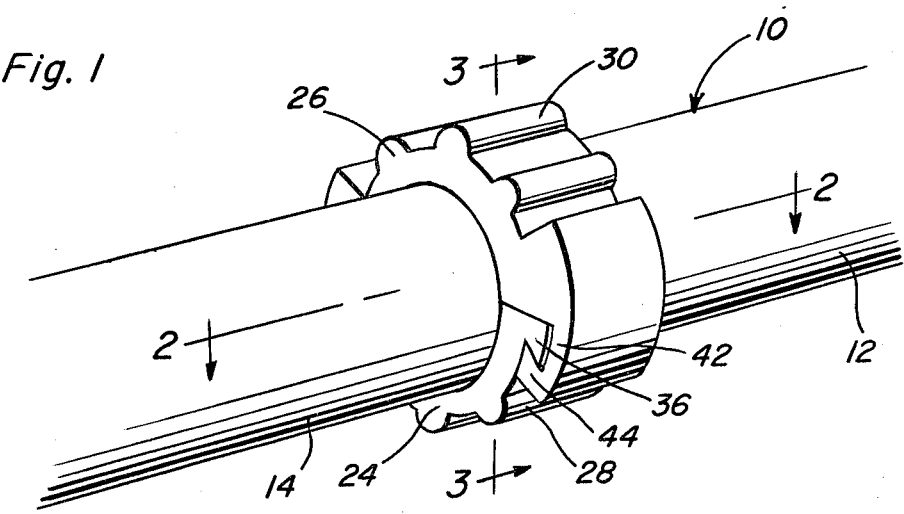
FIG. 1 is a fragmentary perspective view of a coupling joint established between a pair of end aligned pipe sections and with the split threaded coupling nut of the instant invention utilized in securing the joint fluid tight.
Figure 2:
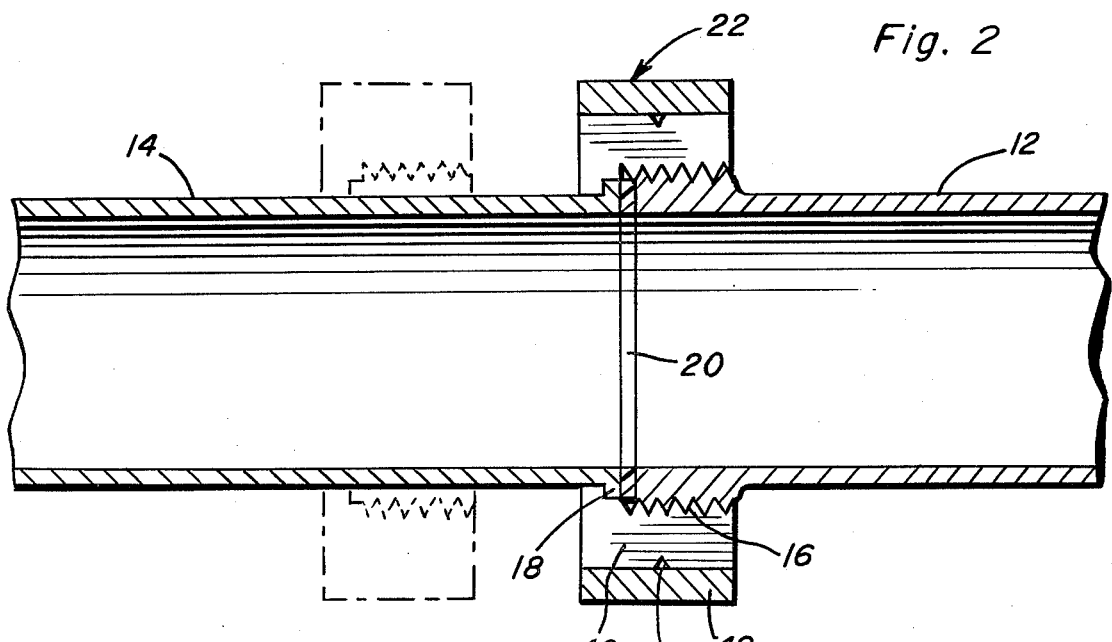
FIG. 2 is an enlarged fragmentary sectional view taken substantially upon the plane indicated by the section line 2—2 of FIG. 1.
Figure 3:
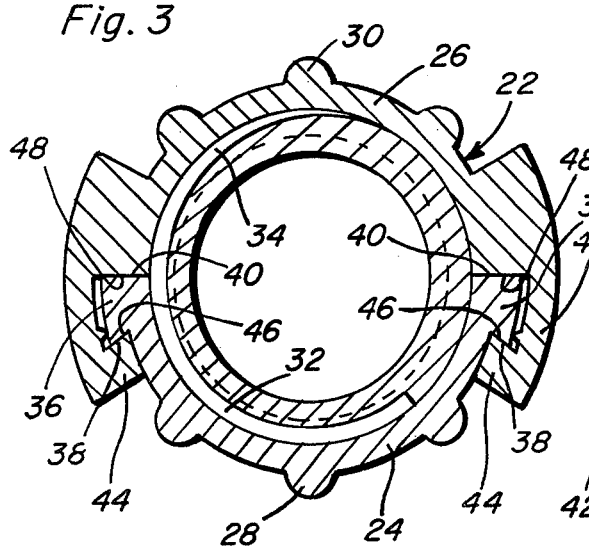
FIG. 3 is an enlarged transverse vertical sectional view taken substantially upon the plane indicated by the section line 3—3 of FIG. 1.
Figure 4:
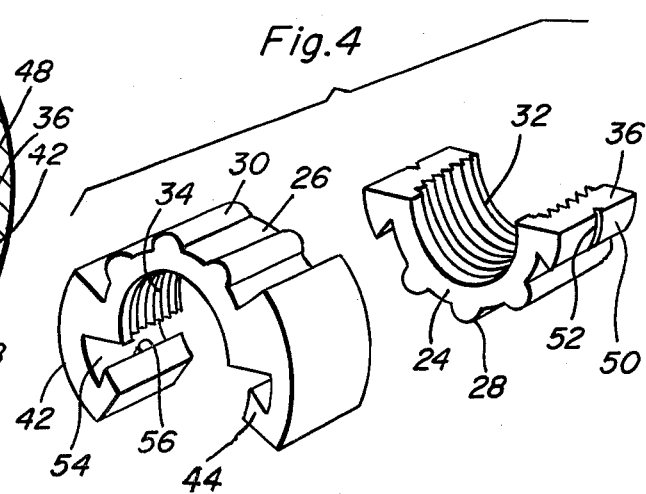
FIG. 4 is an exploded perspective view of the split threaded coupling nut.

Referring now more specifically to the drawings, the numeral 10 generally designates a pipe run consisting of a pair of pipe sections 12 and 14 joined together in fluid tight end abutted relation.

The pipe section 12 includes tapered threads 16 and the pipe section 14 includes a terminal end defined by a radially outwardly projecting and circumferentially extending flange 18. Conventionally, an annular seal member 20 is disposed between the adjacent ends of the sections 12 and 14 and a one-piece threaded slip nut is disposed on the section 14 and threadedly engaged over the threads 16 on the section 12. Tightening of the conventional slip nut causes the opposing ends of the sections 12 and 14 to be drawn toward each other and to thus compress the seal 20 therebetween in order to establish a reasonably rigid fluid tight connection between the sections 12 and 14.

Although conventional peripherally continuous slip nuts do not break or corrode frequently, there are times when conventional slip nuts must be replaced and if a conventional slip nut is to be replaced, the pipe sections joined together thereby must be disassembled and the old slip nut must either be cut from one of the pipe sections or removed from the end thereof remote from the adjacent pipe section in order to allow the new peripherally continuous slip nut to be engaged over the corresponding pipe section.

While split threaded coupling nuts have been heretofore provided and may be engaged about a pipe section without being telescoped over the end of that pipe section remote from the coupling to be formed by the slip nut, known split coupling nuts do not function substantially fully as unitary coupling nuts. The improved split threaded coupling nut of the instant invention is referred to in general by the reference numeral 22 and includes first and second coextensive and generally semi-cylindrical nut halves 24 and 26. The nut halves include roughened exterior surfaces 28 and 30 adapted to be engaged by hand or by tools to facilitate turning of the nut halves 24 and 26 together, as a unitary nut, and the nut halves include coextensively threaded inner surfaces 32 and 34. The first nut half 24 includes arc end generally radially outwardly projecting inner lugs 36 including first abutment surfaces 38 remote and facing in directions opposite from the corresponding arc ends faces 40 of the first nut half 24. The arc ends of the second nut half include outer peripheral extensions 42 projecting outwardly therefrom and terminating outwardly in radially inwardly projecting outer lugs 44 including second abutment surfaces 46 remote and facing in directions opposite from the corresponding arc end faces of the second nut half 26. The first and second abutment surfaces 38 and 46 are abuttingly engaged with each other and the first and second halves 24 and 26 are separable upon relative shifting in axial directions of the nut 22.

The arc end faces 40 of the first nut half 24 are disposed in surface-to-surface juxtapose relation relative to the arc end faces 48 of the second nut half 26 and the arc end faces 40 and 48 are disposed, substantially, on a diametric plane of the nut 22. In addition, corresponding abutment surfaces 38 and 46 are disposed in parallel contacting juxtaposed relation and the abutment surface 46 are disposed in planes inclined relative to the corresponding diametric plane and lie on chords of the second nut half arc.

The outer surfaces 50 of the projections 36 include grooves 52 formed therein and the inner surfaces 54 of the extensions 42 include projections 56 snap seatingly engaged in the corresponding grooves 52 whereby the sections 24 and 26 are releasably interlocked against relative axial shifting and disengagement from each other. The nut halves 24 and 26 are, of course, constructed of a substantially rigid, but slightly resilient, material. When the nut halves 24 and 26 are being axially shifted into or out of engagement with each other, the extensions 42 must flex, slightly, in order to enable the projections 56 to slide over the surfaces 50 and into the grooves 52.

Of course, once the nut halves 24 and 26 are removably engaged with each other, they are exceedingly difficult to disengage from each other.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A split threaded coupling nut comprising a pair of first and second coextensive and generally semi-cylindrical nut halves, said nut halves including exterior surface portions engageable by hand or tools to facilitate turning of said halves, together, as a unitary nut, said nut halves including coextensively threaded inner surfaces, said first nut half including arc end generally radially outwardly projecting inner lugs including first abutment surfaces remote and facing in directions opposite from the corresponding arc end faces of said first nut half, and outer surfaces extending between said arc end faces and first abutment surfaces, the arc ends of said second nut half including outer peripheral extensions projecting outwardly therefrom and terminating outwardly in radially inwardly projecting outer lugs including second abutment surfaces remote and facing in directions opposite from the corresponding arc end faces of said second nut half, and inner surfaces extending between said second abutment surfaces and arc end faces, said first and second abutment surfaces being abuttingly engaged with each other and said first and second halves being separable upon relative shifting in axial directions, said halves being constructed of substantially rigid, but slightly resilient material, the outer surfaces of said inner lugs and the inner surfaces of said extensions including juxtaposed substantially coaxial arcuate surfaces, one set of arcuate surfaces including grooves formed therein extending circumferentially therealong and the other set of arcuate surfaces each including a central projection spaced closely adjacent the corresponding outer lug and snap seated in the corresponding groove.

2. The combination of claim 1 wherein arc end faces are disposed, generally, on diametric planes of said nut halves.

3. The combination of claim 1 wherein said second abutment surfaces are inclined relative to the corresponding diametric plane and lie on chords of said second nut half arc.

* * * * *